US008863648B2

(12) United States Patent
Mori et al.

(10) Patent No.: US 8,863,648 B2
(45) Date of Patent: Oct. 21, 2014

(54) PUMP MOUNT IN A BEVERAGE PREPARATION MACHINE

(75) Inventors: Peter Mori, Walperswil (CH); Markus Lang, Wabern (CH)

(73) Assignee: Nestec S.A., Vevey (CH)

( * ) Notice: Subject to any disclaimer, the term of this patent is extended or adjusted under 35 U.S.C. 154(b) by 464 days.

(21) Appl. No.: 13/203,952

(22) PCT Filed: Jan. 7, 2010

(86) PCT No.: PCT/EP2010/050099
§ 371 (c)(1),
(2), (4) Date: Aug. 30, 2011

(87) PCT Pub. No.: WO2010/108700
PCT Pub. Date: Sep. 30, 2010

(65) Prior Publication Data
US 2011/0308396 A1    Dec. 22, 2011

(30) Foreign Application Priority Data
Mar. 23, 2009 (EP) .................. PCT/EP2009/053368

(51) Int. Cl.
*A23L 1/00* (2006.01)
*A47J 31/44* (2006.01)
*A47J 31/46* (2006.01)

(52) U.S. Cl.
CPC .............. *A47J 31/46* (2013.01); *A47J 31/4403* (2013.01)
USPC .......................................................... 99/275

(58) Field of Classification Search
CPC .............................. A47J 31/46; A47J 31/3609
USPC .................. 99/279, 302 P, 275, 285; 426/231
See application file for complete search history.

(56) References Cited

U.S. PATENT DOCUMENTS

| 2,715,868 | A | | 8/1955 | Brown ............................ 99/302 |
| 3,659,965 | A | * | 5/1972 | Ebert et al. ..................... 417/363 |
| 4,242,568 | A | | 12/1980 | Wunderlin et al. ............ 219/296 |
| 4,595,131 | A | | 6/1986 | Ruskin et al. .................. 222/640 |
| 5,019,690 | A | | 5/1991 | Knepler ........................ 219/400 |
| 5,392,694 | A | | 2/1995 | Muller et al. ................... 99/295 |
| 5,943,472 | A | | 8/1999 | Charles et al. ................ 392/396 |
| 5,992,298 | A | | 11/1999 | Illy et al. ......................... 99/281 |
| 6,393,967 | B2 | | 5/2002 | Fischer .......................... 99/285 |

(Continued)

FOREIGN PATENT DOCUMENTS

| AU | 16549/76 | 2/1978 |
| CH | 682798 | 11/1993 |

(Continued)

OTHER PUBLICATIONS

International Search Report, PCT/EP2009/053368 mailed Oct. 6, 2009.

(Continued)

*Primary Examiner* — Dana Ross
*Assistant Examiner* — Renee L Miller
(74) *Attorney, Agent, or Firm* — Winston & Strawn LLP

(57) ABSTRACT

A beverage preparation machine that includes a housing, a pump which vibrates during use and which is mounted in the housing, and a dampener for preventing or reducing the transmission of vibrations from the pump to other machine parts. The damper includes a spring on which the pump is mounted in the housing.

18 Claims, 2 Drawing Sheets

(56) References Cited

U.S. PATENT DOCUMENTS

| | | | |
|---|---|---|---|
| 6,554,588 B1 | 4/2003 | DiBenedetto | 417/417 |
| 6,889,598 B2 | 5/2005 | Wroblewski | 99/275 |
| 7,286,752 B2 | 10/2007 | Gourand | |
| 8,124,150 B2 * | 2/2012 | Doglioni Majer | 426/231 |
| 2003/0066431 A1 | 4/2003 | Fanzutti et al. | 99/279 |
| 2003/0173352 A1* | 9/2003 | Patterson et al. | 219/494 |
| 2004/0156730 A1* | 8/2004 | Lilie et al. | 417/363 |
| 2005/0115597 A1* | 6/2005 | Carhuff et al. | 134/134 |
| 2007/0107604 A1* | 5/2007 | Wei | 99/279 |
| 2007/0298953 A1* | 12/2007 | Gavillet et al. | 493/108 |
| 2008/0050480 A1 | 2/2008 | Doglioni Majer | |

FOREIGN PATENT DOCUMENTS

| | | |
|---|---|---|
| CH | 593044 | 11/1997 |
| CN | 86200316 U | 11/1986 |
| CN | 2445113 Y | 8/2001 |
| DE | 19737694 | 10/1998 |
| DE | 19732414 | 2/1999 |
| DE | 10259740 A1 | 7/2004 |
| DE | 10322034 | 12/2004 |
| EP | 0485211 | 5/1992 |
| EP | 0761150 | 3/1997 |
| EP | 0784955 | 7/1997 |
| EP | 1 253 844 B1 | 11/2002 |
| EP | 1 299 022 B1 | 4/2003 |
| EP | 1 380 243 A1 | 1/2004 |
| EP | 1610596 | 12/2005 |
| EP | 1646305 | 4/2006 |
| EP | 1 809 151 B1 | 7/2007 |
| EP | 1 867 260 A1 | 12/2007 |
| FR | 2 214 069 | 8/1974 |
| FR | 2299839 | 9/1976 |
| FR | 2544185 | 10/1984 |
| FR | 2799630 | 4/2001 |
| LU | 85318 | 9/1984 |
| WO | WO 00/45685 | 8/2000 |
| WO | WO 01/54551 A1 | 8/2001 |
| WO | WO 01/60221 | 8/2001 |
| WO | WO 2004/006742 | 1/2004 |
| WO | WO 2006/029763 A2 | 3/2006 |
| WO | WO 2006/032599 A2 | 3/2006 |
| WO | WO 2009/043630 | 4/2009 |
| WO | WO 2009/043865 | 4/2009 |
| WO | WO 2009043851 | 4/2009 |
| WO | WO 2009/130099 A1 | 10/2009 |
| WO | WO 2009/150030 A1 | 12/2009 |
| WO | WO 2010/015427 A1 | 2/2010 |

OTHER PUBLICATIONS

International Search Report and Written Opinion, PCT/EP2010/053368 mailed Oct. 6, 2009.
International Search Report and Written Opinion, PCT/EP2010/050099, mailed Mar. 26, 2010.

\* cited by examiner

PUMP MOUNT IN A BEVERAGE PREPARATION MACHINE

This application is a 371 filing of International Patent Application PCT/EP2010/050099 filed Jan. 7, 2010.

BACKGROUND

1. Field of the Invention

The present invention concerns the fixation of a pump in a beverage preparation machine, in particular the fixation of a reciprocating piston pump.

For the purpose of the present description, a "beverage" is meant to include any liquid food, such as tea, coffee, hot or cold chocolate, milk, soup, baby food, etc. . .

2. Background Art

Beverage preparation machines have been known for a number of years. For example, U.S. Pat. No. 5,943,472 discloses a water circulation system between a water reservoir and a hot water or vapour distribution chamber of an espresso machine. The circulation system includes a valve, metallic heating tube and pump that are connected together and to the reservoir via different silicone hoses, which are joined using clamping collars. Suitable pumps for beverage machines are for instance disclosed in U.S. Pat. Nos. 2,715,868, 5,392,694, 5,992,298, 6,554,588, WO 2006/032599 and WO 2009/150030.

For instance, U.S. Pat. No. 2,715,868 discloses a beverage preparation machine for extracting a beverage ingredient within an extraction chamber supplied in a cartridge by water guided into the extraction chamber and forced through the cartridge. The pump is of the rotary type and has blades operating in a pump chamber to transfer liquid under pressure to the extraction chamber.

U.S. Pat. No. 5,392,694 discloses an espresso machine with a piston pump mounted in the machine's housing. The pump has a reciprocating piston that is actuated by an eccentric drive having a connecting rod that is engaged with the piston.

U.S. Pat. No. 5,992,298 discloses a beverage preparation machine with a vibrating pump suspended in mobile or overhung manner, the vibrations being transferred to an in-line heater to vibrate the heater with the view of reducing liming in the heater.

U.S. Pat. No. 6,554,588 discloses a composite piston for vibration pumps suitable for use in espresso machines.

In general, during operation of the pump of such a device, vibrations occur due to an oscillating or rotational movement of a driven part, e.g. a piston or a number of blades, housed within a pump chamber of the pump. These vibrations may then be transferred to the housing of the device and thus negatively affect the quality or operational feel of the beverage preparation device. Moreover, the vibrations may negatively affect other components housed within the housing of the device.

To address this problem, it has been proposed in WO 2006/032599 to suspend the pump in the beverage preparation machine with spaced apart suspenders.

In WO 2009/150030, it has been proposed to support the pump with an elastic leaf support, e.g. a bellow-shaped elastic support member.

SUMMARY OF THE INVENTION

The present invention now simplifies the mounting of a vibrating pump, in particular a reciprocating piston pump, in a beverage preparation machine.

Therefore, the invention relates to a beverage preparation machine comprising: a housing; a pump which vibrates during use and which is mounted in the housing; and a dampener for preventing or reducing the transmission of vibrations from the pump to other machine parts. The dampener comprises a spring on which the pump is mounted in the housing, for example a helicoidal dampening spring.

The beverage preparation machine may include one or more of the following components:

a) a brewing unit for receiving an ingredient of this beverage, in particular a pre-portioned ingredient supplied within a capsule or a pod, and for guiding an incoming flow of liquid, such as water, through said ingredient to a beverage outlet;

b) an in-line heater, such as a thermoblock, for heating this flow of liquid to be supplied to the brewing unit;

c) the abovementioned pump for pumping this liquid through the in-line heater;

d) one or more fluid connecting members for guiding this liquid from a source of liquid, such as a tank of liquid, to the beverage outlet;

e) an electric control unit, in particular comprising a printed circuit board (PCB), for receiving instructions from a user via an interface and for controlling the in-line heater and the pump; and f) one or more electric sensors for sensing at least one operational characteristic selected from characteristics of the brewing unit, the in-line heater, the pump, a liquid reservoir, an ingredient collector, a flow of this liquid, a pressure of this liquid and a temperature of this liquid, and for communicating such characteristic(s) to the control unit.

The heater may be a thermoblock or an on demand heater (ODH), for instance an ODH type disclosed in EP 1 253 844, EP 1 380 243 and EP 1 809 151.

The components may be fully automatically or essentially automatic assembled, as disclosed in WO 2009/130099 which is hereby incorporated by way of reference.

The pump may have a piston movably mounted within a pump chamber, a further spring being optionally provided with the pump chamber to exert a force on the piston. An electromagnetic solenoid can be provided in the periphery of the pump chamber to drive the piston. Thereby, an axial reciprocating movement of the piston within the pump chamber is generated by activation of the solenoid. The piston may include a bore which is selectively closed by a valve in order to pump liquid from a liquid inlet to a liquid outlet connected to the pump chamber.

The pump can be electrically connected to a control unit via an electric connection that does not transmit the vibrations or significantly reduces such vibrations. For instance, the pump is connected via flexible cables or wires. The control unit may include a PCB, the electric connection comprising vibration-barrier flexible cables or wires pre-mounted with both ends on the PCB, and with one of these ends on a detachable portion of the PCB forming a connector for electrically connecting and powering the pump. The detachable PCB portion may be provided with electric connecting stripes. For example, the connector is a plug. Forming the connector as a detachable part of the PCB facilitates automatic assembly: despite the flexible cables, the position of the connector is entirely determined relatively to the PCB before detachment thereof and can thus easily be seized and detached by an automatic assembly system for subsequent automatic connection to the pump.

In one embodiment, the helicoidal dampening spring extends axially around a pump bottom part, in particular a pump inlet. The pump bottom part may form a pump inlet that is connected to a tubing for connecting a water tank, the helicoidal dampening spring extending axially around the pump inlet and/or around the tubing. The pump bottom part may extend axially into the helicoidal dampening spring and form a pump inlet that is connected at a distal end to a tubing for connecting a water tank. In a variation, the helicoidal dampening spring extends axially around a pump top part to suspend the pump.

The helicoidal dampening spring can be supported, e.g. secured, by an inner spring seat. For instance, the spring seat comprises a bottom ledge supporting the dampening spring and peripheral sidewalls maintaining the dampening spring in place. The inner spring seat may delimit a bottom opening through which the pump bottom part extends and/or through which the tubing extends to the pump. The inner spring seat may be integral with or fixed to the housing.

The dampening spring can be arranged to hold and guide an outer pump part, in particular the pump bottom part, or a component connected thereto such as a tubing so as to allow friction free movements of the outer pump part or the connected component when the pump is vibrating. In particular, the dampening spring may be arranged to space apart this outer pump part, e.g. pump bottom part or top part, or connected part from other machine components, in particular from the spring seat and from the housing, so as to allow friction free, or contactless (except with the spring) movements of this outer pump part or connected part when the pump is vibrating during use.

The pump can be held and guided by at least one plain bearing to allow movements of the pump when vibrating, in particular a plain bearing formed by one or more inner walls of the housing. The plain bearing can be arranged to hold and guide an upper part of the pump, in particular the pump outlet.

Hence, it is possible to hold the pump between: a holding and guiding spring on one side, and a plain bearing on another side. It is of course possible to hold the pump between a pair of holding an guiding springs, e.g. helicoidal springs, one at each extremity of the pump, to avoid any vibration transmitting frictions between the pump and the housing or other machine components. Moreover, it is possible to suspend the pump only by a spring, e.g. a helicoidal spring.

The housing may comprise two facing half-shells, the dampening spring being secured between the facing half-shells. In particular the above described spring seat and/or the above described plain bearing, integral with or fixed to the housing, may be formed by the assembly of the half-shells.

BRIEF DESCRIPTION OF THE DRAWINGS

The invention will now be described with reference to the schematic drawings, wherein.

DETAILED DESCRIPTION

Figure 1:
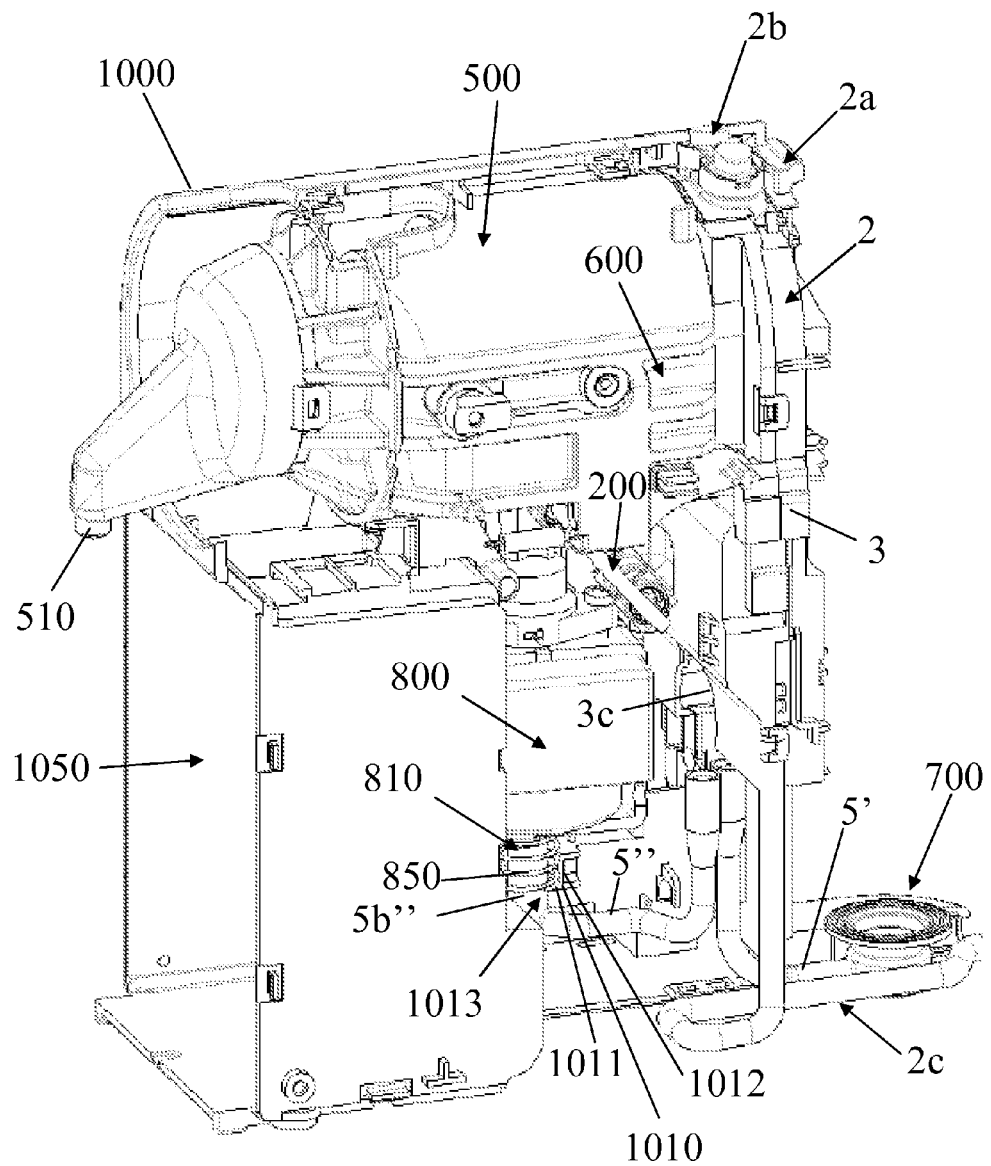
FIG. 1 shows an internal structure of a beverage preparation machine according to the invention.

FIG. 1 illustrates different parts of a beverage preparation machine. Typically, this type of beverage preparation machine is suitable to prepare coffee, tea and/or other hot beverages including soups and like food preparations. The pressure of the liquid circulated to the brewing chamber may for instance reach about 10 to 20 bar. The various parts of the beverage preparation machine and its assembly is disclosed in WO 2009/130099, the content of which is hereby incorporated by reference.

Figure 2:
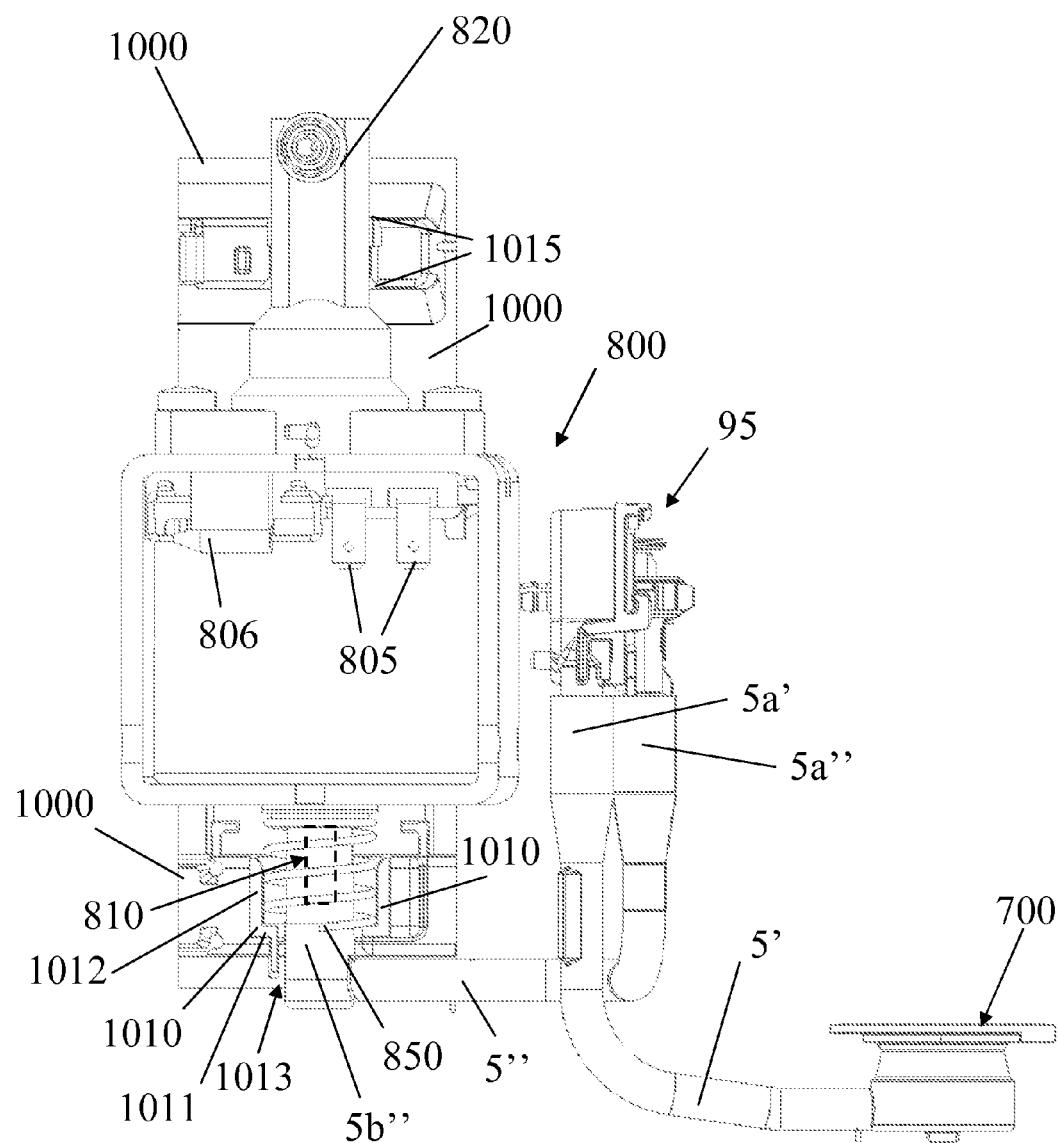
FIG. 2 shows in greater detail the fixation of a pump in the machine illustrated in FIG. 1.

FIG. 1 generally provides an overall view of the internal structure that may be found in a beverage preparation machine according to the invention. FIG. 2 shows in greater detail a particular embodiment of the pump mounted in the beverage preparation machine.

The components are shown mounted in a housing 1000 in a perspective view of part of the beverage preparation machine. Housing 1000 delimits a cavity 1050 for receiving a used capsule collector and a drip tray arrangement, for instance of the type disclosed in EP 1 867 260. The rear part of the machine is arranged to receive a water tank. An outside view with the water tank, capsule collector and drip tray collector of a machine of this kind is shown in PCT/EP09/053139.

For example, housing 1000 is formed of two half-shells, e.g. general clamshells, one of which serves as a receiving support for the assembly of the inner components and modules of the beverage machine into housing 1000. Hence, during assembly, all inner components and modules may be placed and connected within one half-shell. Connection between the components and between the modules may be made before and/or upon assembly into the shell. When all inner components and modules are in place and connected in the half shell, housing 1000 is closed with the second half-shell, in particular by clipping the second half shell against the first one and/or by snap fit. The components and modules are preferably secured within housing 1000 by clipping, snap-fitting, clamping, squeezing or any other geometric immobilisation of the components and modules within a corresponding matching inner geometry of the housing 1000, in particular walls and partitions of the housing. Hence, only few or no screws, rivets, glue, welding or other complicated connections for mechanical assembly and/or hardly disassemblable connections, are needed to secure the inner components and modules within housing 1000. This greatly simplifies the assembly as well as later possible maintenance and/or servicing of the beverage preparation machine.

The beverage preparation machine has a brewing unit 500 for receiving an ingredient of the beverage to be prepared, in particular a pre-portioned ingredient supplied within a capsule or a pod as known in the art. Brewing unit 500 is configured for guiding an incoming flow of liquid, such as water, through the ingredient, to a beverage outlet 510.

Furthermore, the beverage preparation machine has an in-line heater, such as a thermoblock 600, for heating the flow of liquid to be supplied to brewing unit 500. Liquid is driven from a liquid source in the form of a reservoir mounted on a fluid connector 700 through heater 600 via a pump 800 which are all interconnected. Hence, the beverage preparation machine has various connection members, in particular tubes or other members with ducts or channels 5',5",200, for guiding the liquid from reservoir 700 to beverage outlet 510.

Vibrating pump 800 mounted in housing 1000 and shown in greater details in FIG. 2, in which the same numeric references designate the same elements, is of the type of pumps customarily used in beverage preparation machines. Vibrating pumps provide a reliable form of pressure to the circulated liquid. In particular, pump 800 drives water from low pressure system to a higher pressure needed, e.g. in a coffee machine for preparing espresso coffee.

In accordance with the invention, to minimise transfer of vibrations of pump 800 to other parts of the beverage preparation machine, pump 800 is mounted on a spring 850, in particular a helicoidal spring, as indicated in FIGS. 1 and 2.

For controlling the beverage preparation machine, the machine includes an electric control unit 2 shielded by a housing 3 that encloses a PCB, for receiving instructions from a user via an interface 2b and for controlling in-line heater 600 and pump 800.

Pump 800 has a safety fuse 806 and electric connectors 805 that are electrically connected to control unit 2. Preferably, the electric connection to a control unit 2 does not transmit the vibrations or significantly reduces vibrations, the pump being in particular connected via flexible cables or wires to control unit 2. For instance, such electric connection comprises flexible cables or wires pre-mounted with both ends on PCB, with one of these ends on a detachable portion of PCB, such as a portion provided with electric connecting stripes, forming a connector, such as a plug or socket, for electrically connecting and powering pump 800. Alternatively, cables may be soldered or welded directly to the pump and the PCB.

Housing 3 has an opening 3c for accommodating a flowmeter 95 that is directly assembled onto the PCB secured in housing 3 and that is connected within fluid circuit 5 extending outside housing 3.

The beverage preparation machine has one or more electric sensors, for example flowmeter 95, for sensing at least one operational characteristic selected from characteristics of brewing unit 500, in-line heater 600, liquid reservoir, an ingredient collector in cavity 1050, pump 800, a flow of the liquid, a pressure of the liquid and a temperature of the liquid, and for communicating such characteristics to control unit 2.

Also shown in FIG. 1, a master switch 2a connected to control unit 2 and an electric cord 2c for connection to the mains.

As can be seen in FIG. 1, a low pressure system 5',5" makes the link between the water tank connector 700, flow meter 95 and pump 800. Water tank connector 700 is connected to a tubing 5',5" of the low pressure water circulation system. This tubing connects a water reservoir (not shown) to pump 800. Downstream from connector 700, flow meter 95 is located between tubular sections 5',5". Flow meter 95 is connected, at an intermediate portion of tubing 5',5" inbetween an intermediate tubing outlet 5a' and inlet 5a" that are integral with tubing 5',5".

In fact, tubing 5',5", tubing's tank connector 700, intermediate outlet 5a' and inlet 5a" of tubing 5',5" and outlet 5b" may form a single component which makes it suitable to be handled automatically by providing reference parts. Indeed, despite a possible use of flexible non-resilient tubular sections 5',5", e.g. made of silicon, the end portions 700, 5b" and intermediate portions 5a',5a" may be oriented and spatially referenced automatically, e.g. by using a vibrating bowl, for full automatic handling and assembly thereof within the beverage preparation machine.

The integration of these low-pressure tubing parts and pump support member results in the reduction in the number of stand alone parts of the beverage preparation machine and therefore, this leads to the reduction of the overall number of parts. The consequence is the improvement of assembly for the beverage preparation device and a cost reduction as well as an automatic assembly process that does not require human intervention.

In addition, since the number of connectors is decreased, a greater integration and reliability of the system is achieved, by eliminating the weak spots where leaks can occur. The disposition of flow meter 95 integrated between the water tank connector and the pump is optional. For instance, the flow meter may be provided downstream from the pump before or after an in-line water heater.

Pump 800 can be a vibrating pump of the type known in the field of beverage preparation machines. For instance, a piston is movably mounted within a pump chamber (not shown). Preferably, a spring may be provided within the pump chamber in order to exert a force on the piston. Moreover, an electromagnetic solenoid can be provided in the periphery of the pump chamber in order to drive the piston. Hence, an axial reciprocating movement of the piston within the pump chamber is enabled due to activation by means of the solenoid. The pump chamber is connected via a liquid inlet 810 (shown in doted lines in FIG. 2) and a liquid outlet 820 of pump 800. The pump's piston normally includes a bore which can be selectively closed by a valve in order to pump liquid from liquid inlet 810 to liquid outlet 820 of pump 800 during the reciprocating movement of the piston. Inlet 810 has an outer serrated connection portion that is force-fitted into outlet 5b" of tubing 5',5", e.g. made of silicon, so as to provide a water-tight sealed connection between pump 800 and fluid circuit 5',5".

Preferably, the reciprocating piston of pump 800 is arranged to move generally in the axial direction of dampening spring 850. The helicoidal dampening spring 850 extends axially around a pump bottom part 810, in particular a pump inlet. Hence, the pump bottom part 810 may form a pump inlet (shown in dotted lines in FIG. 2) that is connected to tubing 5',5" via tubing outlet 5b". Helicoidal dampening spring 850 extends axially around pump inlet 810 and around the tubing 5',5". It follows that spring 850 can be mounted at the extremity of pump 800 when pump inlet 810 is connected to outlet 5b".

Helicoidal dampening spring 850 is supported by an inner seat 1010. Spring seat 1010 comprises a bottom ledge 1011 supporting the dampening spring 850 and peripheral sidewalls 1012 maintaining the dampening spring in place. Inner spring seat 1010 delimits a bottom opening 1013 through which outlet 5b" extends.

Inner spring seat 1010 is integral with or fixed to the housing 1000. Typically, seat 1010 can be moulded with housing 1000.

Dampening spring 850 is arranged to hold and guide an outer pump part, in particular pump bottom part 810, or a component connected thereto such as tubing outlet 5b", so as to allow friction free movements of the outer pump part or the component connected thereto when pump 800 is vibrating.

In particular, spring 850 spaces pump inlet 810 and tubing outlet 5b" from housing 1000 and from the seat 1010, so as to allow friction free reciprocating movements of these parts held by spring 850 when pump 800 is vibrating during use.

Moreover, to balance pump 800, a plain bearing 1015 is provided to hold and guide pump 800 and to allow movements of the pump when vibrating, in particular a plain bearing formed by one or more inner walls of housing 1000, in particular by facing elements of the half-shells of housing 1000. Plain bearing 1015 is arranged to hold and guide an upper part of the pump, in particular the pump outlet (820).

It is of course possible to replace plain bearing 1015 by a second dampening spring, e.g. of the same type as dampening spring 850, connected to the top part of pump 800, e.g. adjacent outlet 820, or even to use a single dampening spring and let the bottom part, e.g. inlet 810, freely moving by itself or with outlet 5b" of tubing 5',5".

Assembly 200 includes a connector for connecting pump outlet 820. A similar rigid tubular system may also be provided upstream the pump (not shown). Such connectors are explained in detail in WO 2009/130099.

Hence, vibrations resulting from the operation of pump 800 may be absorbed at this connection without significant transmission through the fluid circuit. Moreover, due to an elastic sealing member in the connector for outlet 820, inhibition of vibration transmission is even further enhanced.

To further inhibit vibration communication downstream the pump to the beverage preparation machine, in particular to heater 600, a similar connection can be provided between tube 200 and the inlet of heater 600.

What is claimed is:

1. A beverage preparation machine comprising: a housing; a pump which vibrates during use and which is mounted in the housing; and a dampener for preventing or reducing the transmission of vibrations from the pump to other machine parts, wherein the dampener comprises a helicoidal dampening spring upon which the pump is mounted in the housing, wherein the pump comprises a piston movably mounted within a pump chamber, an electromagnetic solenoid being provided in the periphery of the pump chamber to drive the piston, an axial reciprocating movement of the piston within the pump chamber being enabled due to activation by means of the solenoid.

2. The machine of claim 1, which further comprises a further spring provided with the pump chamber to exert a force on the piston.

3. A beverage preparation machine comprising: a housing; a pump which vibrates during use and which is mounted in the housing; and a dampener for preventing or reducing the transmission of vibrations from the pump to other machine parts, wherein the dampener comprises a helicoidal dampening spring upon which the pump is mounted in the housing, wherein the pump is electrically connected to a control unit via an electric connection that does not transmit the vibrations or significantly reduces the vibrations, with the pump being connected via flexible cables or wires.

4. The machine of claim 3, wherein the control unit comprises a printed circuit board (PCB), the electric connection comprising flexible cables or wires pre-mounted with both ends on the PCB, with one of the ends on a detachable portion of the PCB forming a connector for electrically connecting and powering the pump.

5. The machine of claim 3, wherein the detachable portion is provided with electric connecting stripes and a plug for electrically connecting and powering the pump.

6. A beverage preparation machine comprising: a housing; a pump which vibrates during use and which is mounted in the housing; and a dampener for preventing or reducing the transmission of vibrations from the pump to other machine parts, wherein the dampener comprises a helicoidal spring mounted in the housing beneath the pump and upon which the pump is mounted, so that pump movement is generally in the direction of the dampening spring, wherein the dampening spring is arranged to hold and guide an outer pump part to allow friction free movements of the outer pump part when the pump is vibrating.

7. The machine of claim 6, wherein the pump includes a bottom part extending axially into the helicoidal dampening spring.

8. The machine of claim 6, wherein the pump bottom part forms a pump inlet that is connected to tubing for connection to a water tank, and wherein the helicoidal dampening spring extends axially around the pump inlet or around the tubing so as to allow friction-free reciprocating movements of the pump or tubing when the pump is vibrating.

9. The machine of claim 6, wherein the helicoidal dampening spring is supported by an inner spring seat.

10. The machine of claim 9, wherein the spring seat comprises a bottom ledge supporting the dampening spring and peripheral sidewalls for maintaining the dampening spring in place.

11. The machine of claim 9, wherein the inner spring seat delimits a bottom opening through which the pump bottom part or through which the tubing extends to the pump.

12. The machine of claim 9, wherein the inner spring seat is integral with or fixed to the housing.

13. The machine of claim 6, wherein the outer pump part is a pump bottom part or a component or tubing connected thereto so as to allow friction free movements of the outer pump part or the connected component when the pump is vibrating.

14. The machine of claim 1, wherein the pump is held and guided by at least one plain bearing to allow movements of the pump when vibrating.

15. The machine of claim 14, wherein the plain bearing is formed by one or more inner walls of the housing.

16. The machine of claim 14, wherein the plain bearing is arranged to hold and guide an upper part or pump outlet of the pump.

17. The machine of claim 1, wherein the housing comprises two facing half-shells, with the dampening spring secured between the facing half-shells.

18. A beverage preparation machine comprising: a housing; a pump which vibrates during use and which is mounted in the housing; and a dampener for preventing or reducing the transmission of vibrations from the pump to other machine parts, wherein the dampener is mounted in the housing beneath the pump and comprises a helicoidal dampening spring upon which the pump is mounted; wherein the pump includes a bottom part extending into the helicoidal dampening spring, and the helicoidal dampening spring is supported by a seat comprising a bottom ledge supporting the dampening spring and peripheral sidewalls for maintaining the dampening spring in a position beneath the pump so that pump movement is generally in the direction of the dampening spring.

* * * * *